United States Patent [19]

Koszalka et al.

[11] Patent Number: 5,198,122

[45] Date of Patent: Mar. 30, 1993

[54] METHOD OF DETOXIFICATION OF SUBSTANCES BY UTILIZATION OF ULTRASONIC ENERGY

[75] Inventors: Duane P. Koszalka; James F. Soodsma; Rebecca A. Bever, all of Mound Valley, Kans.

[73] Assignee: Trinity Environmental Technologies, Inc., Mound Valley, Kans.

[21] Appl. No.: 927,878

[22] Filed: Aug. 10, 1992

Related U.S. Application Data

[63] Continuation of Ser. No. 681,715, Apr. 8, 1991, abandoned.

[51] Int. Cl.$^5$ ................................................ C02F 1/36
[52] U.S. Cl. ................................. 210/748; 134/1; 134/25.1; 134/42; 208/262.1; 208/262.5; 210/757; 210/759; 210/763; 210/908; 210/909; 405/128; 588/210; 588/212
[58] Field of Search ............... 134/1, 25.1, 26, 34, 134/42; 208/262, 263, 262.1, 262.5; 210/748, 753–763, 908, 909; 405/128; 588/210, 212

[56] References Cited

U.S. PATENT DOCUMENTS

| | | | |
|---|---|---|---|
| 2,417,722 | 3/1947 | Wolff | 210/748 |
| 4,003,832 | 1/1977 | Henderson et al. | 210/760 |
| 4,076,617 | 2/1978 | Bybel et al. | 210/748 |
| 4,144,152 | 3/1979 | Kitchens | 588/212 |
| 4,284,516 | 8/1981 | Parker et al. | 210/757 |
| 4,388,194 | 6/1983 | Hills | 210/759 |
| 4,477,357 | 10/1984 | Sittenfield | 210/748 |
| 4,761,221 | 8/1988 | Rossi et al. | 210/909 |
| 4,767,543 | 8/1988 | Chornet et al. | 210/759 |
| 4,839,042 | 6/1989 | Tumiatti et al. | 210/909 |
| 4,841,998 | 6/1989 | Bruya | 210/908 |
| 4,861,484 | 8/1989 | Lichtin et al. | 210/748 |
| 5,019,175 | 5/1991 | Rogers et al. | 210/909 |
| 5,043,080 | 8/1991 | Cater et al. | 210/759 |
| 5,051,030 | 9/1991 | Saha et al. | 210/908 |
| 5,053,142 | 10/1991 | Sorensen et al. | 210/912 |
| 5,068,038 | 11/1991 | Fischer et al. | 210/908 |

FOREIGN PATENT DOCUMENTS

| | | | |
|---|---|---|---|
| 3728201 | 3/1989 | Fed. Rep. of Germany | 210/748 |
| 52-52464 | 4/1977 | Japan | 210/748 |
| 60-161495 | 8/1985 | Japan | 210/748 |
| 637034 | 7/1983 | Switzerland | 210/760 |

OTHER PUBLICATIONS

Feasibility Studies of Applications of Catalytic Oxidation in Wastewater, Water Pollution Research Series, EPA, Washington, D.C. Rept. 17020ECl, 1971.

*Primary Examiner*—Peter Hruskoci
*Attorney, Agent, or Firm*—Litman, McMahon & Brown

[57] ABSTRACT

An improved method for detoxification of contaminated liquids or solid materials by the application of ultrasonic energy to the material in the presence of agents capable of initiating chemical reactions with toxic contaminants, which chemical reactions facilitate the removal of the toxic contaminants.

16 Claims, No Drawings

METHOD OF DETOXIFICATION OF SUBSTANCES BY UTILIZATION OF ULTRASONIC ENERGY

This application is a continuation of Ser. No. 681,715 filed Apr. 8, 1991, now abandoned.

BACKGROUND OF THE INVENTION

This invention relates to an improved method for the detoxification of liquid or solid materials and, more specifically, to the molecular conversion of such contaminants into less hazardous substances by the use of ultrasonic energy and chemical reagents.

Ultrasonic energy is known as a means to effect various physical and chemical changes in compounds. In particular, ultrasonic energy may be used as a tool to break or alter chemical bonds for the initiation of reactions or to boost existing reactions which otherwise occur more slowly. Uses of and theoretical mechanisms for the application of ultrasonic energy to effect chemical changes has been discussed in Boucher, "Sonochemistry at Low and High Ultrasonic Frequencies", *Progress Report*, March, 1970, Vol. 15, No. 3; Weissler, "Sonochemistry: The Production of Chemical Changes with Sound Waves", *J. Acustica. Soc. of America*, Vol. 25, No. 4 (July, 1953), pp. 651–657; and U.S. Pat. No. 4,477,357 to Sittenfield, which are all incorporated herein by reference.

It is theorized that the mechanism by which ultrasonic waves produce chemical change involves the phenomenon of cavitation, which is the formation and subsequent rapid collapse of cavities (bubbles in liquid) which are filled with the gas or vapor that may be present in the material itself or in the surrounding atmosphere. The collapse produces very large amplitude shock waves with an attendant rapid and substantial increase in temperature. Particles, in gas, liquid or solid states, or other types of discontinuities, may act as nuclei for the initiation of cavitation.

Ultrasonic energy in wave form may be used to form and collapse the cavities in a cyclic nature, which cycling may be used to create what is known as cavity (or bubble) resonant size. When the cavities reach resonant size, the collapse of the cavities occurs at such a rate that high local pressures of about 20,000 atmospheres and temperatures of about 10,000 Kelvin are attained.

Although high temperatures can be achieved, the high temperatures are transitory. However, the rise in temperature can be sustained for sufficient time to initiate a desired chemical change which otherwise is less likely to occur under standard temperature and pressure conditions.

It is theorized that the rise in temperature initiates the formation of free radicals by causing disassociation of molecular bonds of materials being treated. The free radicals may then react with other molecules present to form additional free radicals, thus propagating a chain reaction. Free radicals may also combine to terminate the chain reaction by forming new molecules which are either more desirable (less toxic) or which may be more readily extracted (than the unconverted contaminant) from the material being treated.

Yield of the desired chemical reactions or changes effecting detoxification is directly proportional to the intensity of cavitation, which cavity intensity is itself proportional to the amplitude of the cycling cavity size. The amplitude of the cavity size is itself further dependent upon medium viscosity (the higher the viscosity of the reactant medium, the lower the amplitude and the lower the pressure exerted by collapsing cavities) and is also directly proportional to the amplitude of the transducer surface that creates the ultrasonic wave emitted into the medium. The yield is, yet further, directly proportional to the chemical activity of the toxic materials in the medium being treated.

Ultrasonic waves in the lower portion of the ultrasonic frequency range, usually about twenty (20) KHz, are generally used because, at such frequencies, the resonant cavity size for typical materials treated is large, causing cavity collapses with greater force compared to that generated by collapse of smaller cavities produced by higher frequency ultrasonic waves.

Although subjection of contaminants to ultrasonic energy, without regard to the yield influencing factors that are discussed above, can result in some cleavage and detoxification (e.g. dehalogenation of an aromatic ring), the detoxification yield may not be optimum.

Further, even though it is known that the addition of certain alkaline agents, such as those disclosed in U.S. Pat. No. 4,477,357, to a treated medium is claimed to improve detoxification yield, such alkaline agents therein disclosed do not furnish optimum yields. Other reagents have been discovered which either offer better yields or are more readily available or are better suited for particular detoxification applications.

SUMMARY OF THE INVENTION

In accordance with the present invention, ultrasonic energy is applied to detoxify contaminated liquid and solid materials. More particularly, ultrasonic energy is applied to eliminate halogenated organics (also called organic halides), including halogenated organic aromatic compounds and similar toxic (or undesirable contaminants of a type which are ordinarily chemical stable) from the materials. The detoxification can be effected without causing any appreciable destruction of the treated material medium.

It has been, further, discovered that the presence of a relatively small amount of oxidants, reducers and other compounds reactive with halogenated organics or similar toxins (in addition to previously used alkaline reagents), significantly improves the detoxification of the material being treated with ultrasonic energy.

OBJECTS OF THE INVENTION

The principal objects of the present invention are: to provide an improved method for the detoxification of contaminated liquid or solid materials; to provide such an improved detoxification method which minimizes damage to the medium being contaminated; to provide a method for the detoxification of substances by the utilization of ultrasonic energy; to provide such an improved detoxification method using reagents which improve detoxification yields when ultrasonic energy is applied to contaminated materials; to provide an improved method for the detoxification of substances by utilization of ultrasonic energy in the presence of oxidants, reducers or other compounds reactive with halogenated organics or similar toxins; to provide such a method which optimizes detoxification using ultrasonic energy without the use of reagents; and to provide such an improved detoxification method which is relatively easy to use, relatively inexpensive to use, and which is particularly well adapted for the intended usage thereof.

Other objects and advantages of this invention will become apparent from the following description wherein is set forth, by way of illustration and example, certain embodiments of the invention.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific methods and functional details disclosed herein are not to be interpreted as limiting, but merely as a basis for the claims and as a representative basis for teaching one skilled in the art to variously employ the present invention in virtually any appropriately detailed method.

In accordance with the present invention, an improved method is disclosed for detoxification of liquids or solid materials contaminated with the organic halides by the application of ultrasonic energy to the material in the presence of chemical reagents. The reagents chosen are capable of initiating chemical reactions with the organic halides when exposed to ultrasonic energy, the reaction products of which are either less toxic or are more readily removed from the treated material. The detoxification can be effected without causing any appreciable destruction of the treated material.

It has been discovered that the chemical reagents used in accordance with the present invention, when added in relatively small amounts to the contaminated material, significantly increase the detoxification yield of the contaminated material exposed to ultrasonic energy. The chemical reagents of the present invention include oxidants; reducers; Li AlH$_4$ (lithium aluminum hydride with hydrogen gas under pressure where water is not substantially present); Ba(OH)$_2$ (barium hydroxide) in ethanol or in CCl$_4$ (carbon tetrachloride); sodium borohydride (when water is present); a peroxide (but not limited to hydrogen peroxide) catalyzed by either ferrous iron (FE(II)) or ferric iron (FE(III)); or phase transfer catalyst PEG400 (polyethylene glycol of molecular weight 400) with O$_2$ and KOH (potassium hydroxide). The oxidants include, without limitation, calcium peroxide, sodium perborate monohydrate, sodium hypochlorite (bleach), potassium permangante, oxygen and ozone.

The reagent should be present in the starting mixture in stoichiometric excess amounts as compared to the contaminated material to be detoxified or destroyed by the process of the present invention. In general, there is no required maximum of the reagent. However, for best detoxification of the contaminated material there should be at least a stoichiometric equivalence of the reagent to halogenated organic compounds.

Ultrasonic energy, in the presence of the reagents, may be applied to the contaminated material on either a continuous or batch basis. Further, it is foreseen that a radical reaction in the contaminated material can be self sustaining (without use of reagents) by the imposition of a pulse-effect created by passing the contaminated material through a long, tubular ultrasonic reactor with many ultrasonic irradiators along its length. Further, it is foreseen that use of a pressurized reaction vessel (with or without reagents) containing the contaminated material should increase the detoxification reaction rate due to magnified effects of cavitation implosion.

Very small amounts of a wetting agent may be added prior to subjection of the contaminated material to ultrasonic energy. The wetting agent can be as high as 1% by weight of the contaminated material, but is preferably in the range of about 0.01 to 0.1 weight % of the contaminated material. Typical wetting agents include simple sulfated and sulfonated compounds such a polyalkyl benzene sulfonates and the sulfonated simple terpenes as well as the simple non-ionic surfactants of the polyethenoxy and the polymeric ester types. Examples of such compounds are sold under BASF trademarks or trade names such as "Pluronic" (propylene oxide ethylene oxide co-polymers), "F68", "F87", "F127" and "25R8" and "TO-75" (sodium dioctyl sulfosuccinate) sold by American Cyanamide.

The following examples are illustrative of the invention and are not intended to be limiting upon the scope of the invention:

EXAMPLE 1

Twenty grams of soil spiked with 100 ppm (parts per million) pCB 1254 (polychlorinated biphenyls; 54% chlorine by weight), a 30 milliliter aqueous solution containing 30% hydrogen peroxide and 0.01 grams of trisodium phosphate (a wetting agent) were mixed. This mixture was irradiated with ultrasonic energy from an initial Heat Systems Model 380 ultrasonic generator for 5 minutes at power setting of 100 watts and 20 KHz. Thereafter, the mixture was dried in an oven at 90 degrees centigrade and was, thereafter, extracted with hexane. The extract was analyzed by ECD GD (electron capture detection gas chromatography). The analysis showed 37 ppm PCB remaining in the soil.

EXAMPLE 2

Twenty grams of soil spiked with 85 ppm PCB 1254, a 50 milliliter aqueous solution containing 15 grams of sodium percarbonate and 0.5 grams of Fe(II) chloride was mixed. The mixture was irradiated with ultrasonic energy from a Heat Systems Model 380 ultrasonic generator for 5 minutes at power setting of 100 watts and 20 KHz. The mixture was, thereafter, dried in an oven at 90 degrees centigrade and extracted with hexane. The extract was analyzed by ECD GC. The analysis showed 70 ppm of PCB remaining in the soil.

EXAMPLE 3

Ten grams of soil spiked With 85 ppm PCB 1254, a 50 milliliter aqueous solution containing 7.5 grams of potassium peroxymonosulfate triple salt (potassium peroxymono sulfate, potassium hydrogen sulfate, potassium sulfate) and 0.25 grams of Fe(II) chloride were mixed. This mixture was irradiated with ultrasonic energy from a Heat Systems Model 380 ultrasonic generator for 5 minutes at power setting of 100 watts and 20 KHz. The mixture was dried in an oven at 90 degrees centigrade and was, thereafter, extracted with hexane. The extract was analyzed by ECD GC. The analysis showed 68 ppm of PCB 1254 remaining in the soil.

EXAMPLE 4

100 milliliters of water spiked with 50 ppm OCT ortho chlorotoluene), a 30 milliliter aqueous solution containing 30% hydrogen peroxide and 0.01 grams of trisodium phosphate were mixed. This mixture was irradiated with ultrasonic energy from an Heat Systems Model 380 ultrasonic generator for 5 minutes at power setting of 100 watts and 20 KHz. Thereafter, the mixture extracted with hexane. The extract was analyzed by ECD GC. The analysis showed 2.5 ppm OCT remaining in the water.

EXAMPLE 5

100 milliliters of water spiked with 50 ppm OCT, a 50 milliliter aqueous solution containing 15 grams of sodium percarbonate and 0.5 grams of FE(II) chloride were mixed. The mixture was irradiated with ultrasonic energy from a initial Heat Systems Model 380 ultrasonic generator for 5 minutes at power setting of 100 watts and 20 KHz. The mixture extracted with hexane. The extract was analyzed by ECD GC. The analysis showed 0.5 ppm OCT remaining in the soil.

It is foreseen that oxygen and ozone can be used in accordance with the present invention, but must first be dissolved in a solution of the contaminated material. Since oxygen and ozone are in a gaseous phase, when dissolved in liquid contaminated material, detoxification with ultrasonic energy must be carried out under pressure to minimize the degasification normally occurring due to ultrasonic cavitation. The pressurized medium containing dissolved oxygen or ozone gas can be irradiated with an effective amount of ultrasonic energy. Thereafter, the gaseous phase oxidant can be removed from the solution by ebullition.

It is foreseen that a organic halide-spiked soil can be added to an aqueous mixture of 1% lithium-aluminum hydride ($LiAlH_4$) into which mixture hydrogen gas is dissolved. The mixture, under pressure, can then be irradiated with an effective amount of ultrasonic energy for 1 minute. Under such irradiation, chloride atoms can be expected to be stripped from the organic halide and replaced with hydrogen atoms, with the chlorine atoms combining with hydrogen to form acid.

It is further foreseen that anhydrous ammonia can be added to completely dried, organic halide-spiked soil. The system should be pressurized to a pressure of about 100 psig. The pressurized mixture can be irradiated with ultrasonic energy for 1 minute at 100 watts. The ammonia can be expected to be stripped of a hydrogen atom and the resulting ammonia radical will displace a chlorine atom on the organic halide. The organic halide can be expected to be reduced to a saturated hydrocarbon and the chlorine (or other halide) atom can be expected to combine with ammonium present.

It is also foreseen that an organic halide-spiked soil can be mixed with a solution of barium hydroxide ($Ba(OH)_2$) in ethanol. When the mixture is irradiated with ultrasonic energy for 1 minute at 100 watts, the halide can be expected to be replaced with an ethanol molecule generally resulting in a saturated hydrocarbon and halide with the hydroxide compound acting as a catalyst. Sodium hydroxide may be substituted for barium hydroxide.

Further, it is foreseen that organic halide-spiked soils can be mixed with a phase transfer catalyst PEG400 and oxygen gas and potassium hydroxide (KOH). The PEG400 can be expected to quicken the movement of hydrophobic halocarbons into the aqueous solution. The halide atom can be expected to be replaced with either an OH radical or $O_2H$ radical forming the alcohol or acid of the organic halide.

Further, it is foreseen that 20 grams of organic halide-spiked soil can be added to 50 millimeters of water and ultrasonically irradiated for 5 minutes. The ultrasonic cavitation will disassociate the water molecule into hydroxide and hydride radicals. These radicals displace halide atoms from organic halide materials reducing the organic halide materials to simple acids and $CO_2$ in water.

In accordance with the present invention, although not required, degassed water is preferentially used which is theorized to increase cavitation intensity while decreasing cavitation quantity. Further, aqueous solutions are preferentially used for detoxification in accordance with the present invention, rather than organic solvents. It is theorized that the hydrogen bonding of water improves the detoxification yield.

It is also foreseen that laser or microwave energy used to vibrate a piezoelectric crystal in contact with contaminated materials may generate sufficient ultrasonic energy to facilitate the degradation of halogenated organics.

It is theorized that the ultrasonic energy, when applied with or without reagents present, improves the reaction activity of the contaminants discussed above due to the effects of shearing strain and voluminal strain on the chemical bonds. Further, when the contaminants are subjected to the ultrasonic energy in the presence of the reagents discussed above, the reagent behaves as a catalyst to effect the detoxification reaction.

It is to be understood that while certain forms of the present invention have been illustrated and described herein, it is not to be limited to the specific forms or arrangement of parts described and shown.

What is claimed and desired to be secured by Letters Patent is as follows:

1. A method of detoxifying liquid and solid materials containing organic halides, comprising the steps of:
   a) adding to the materials to form a mixture an effective amount of sodium borohydride to act as a catalyst for converting said organic halides into less hazardous substances, said sodium borohydride being present in the mixture in an amount that is at least stoichiometrically as great as the organic halides equivalent in the material; and
   b) applying ultrasonic radiation to the material in a sufficient amount to cause cavitation in the mixture.

2. A method of detoxifying liquid and solid materials containing organic halides, comprising the steps of:
   a) adding to the materials to form a mixture an effective amount of a reagent to act as a catalyst, the reagent selected from a group consisting of sodium borohydride, lithium aluminum hydride, hydrogen and mixtures thereof; said reagent being present in the mixture in an amount that is at least stoichiometrically as great as the organic halides equivalent in the material for converting said organic halides into less hazardous substances; and
   b) applying ultrasonic radiation to the material in a sufficient amount to cause cavitation in the mixture.

3. The method as set forth in claim 2 wherein said reagent is sodium borohydride.

4. The method as set forth in claim 2 wherein said reagent is lithium aluminum hydride.

5. A method of detoxifying oil containing toxic halogenated organic compounds which comprises the steps of:
   a) adding to the oil an amount of a reagent being reactive with the halogenated organic aromatic compound, said reagent being present in an amount that is at least stoichiometrically as great as the halogen equivalent in the oil, said reagent selected from a group consisting of sodium borohydride, lithium aluminum borohydride, hydrogen and mixtures thereof;

b) subjecting the oil and reagent to sufficient ultrasonic radiation to cause cavitation for converting said organic aromatic compounds to less hazardous substances.

6. The method as set forth in claim 5 wherein the reagent is sodium borohydride.

7. The method as set forth in claim 5 wherein the reagent is lithium aluminum hydride.

8. The method as set forth in claim 5 including the step of adding to the oil an effective amount of a wetting agent for wetting said compounds.

9. A method of detoxifying soil containing toxic halogenated compounds which comprises the steps of:
   a) adding a sufficient amount of water to the soil to form an aqueous solution;
   b) adding a reagent selected from a group consisting of sodium borohydride, lithium aluminum borohydride, hydrogen and mixtures thereof in an amount that is at least stoichiometrically as great as the equivalent of halogen in the soil to form an aqueous suspension;
   c) subjecting the suspension to sufficient ultrasonic radiation to cause cavitation therein for converting said compounds to less hazardous substances;
   d) forming an effluent containing decontaminated soil;
   e) removing the soil from the aqueous phase; and
   f) washing and drying the soil.

10. The method as set forth in claim 9 wherein said reagent is sodium borohydride.

11. The method as set forth in claim 9 wherein said reagent is lithium aluminum hydride.

12. The method as set forth in claim 9 including the step of adding an effective amount of a wetting agent for wetting said soil with said water to the aqueous solution prior to its subjection to ultrasonic radiation.

13. A method of detoxifying a mixture containing water and toxic halogenated organic compounds which comprises the steps of:
   a) adding to the mixture an amount of a reagent being reactive with the halogenated organic compound and selected from a group consisting of sodium borohydride, lithium aluminum borohydride, hydrogen and mixtures thereof; said reagent being present in an amount that is at least stoichiometrically as great as the halogen equivalent in the water; and
   b) subjecting the water and reagent to sufficient ultrasonic radiation to cause cavitation for converting said compounds to less hazardous substance.

14. The method as set forth in claim 13 wherein said reagent is sodium borohydride.

15. The method as set forth in claim 13 wherein said reagent is lithium aluminum hydride.

16. The method as set forth in claim 13 including the step of adding to said compounds an effective amount of a wetting agent for wetting said compounds with said water.

* * * * *